United States Patent [19]
Ogino

[11] Patent Number: 5,343,453
[45] Date of Patent: Aug. 30, 1994

[54] METHOD FOR ACCESSING DESIRED TRACK ON DISK WITH PLURALITY OF RECORDING ZONES WITH HEAD, AND APPARATUS THEREFORE

[75] Inventor: Tsukasa Ogino, Yokohama, Japan
[73] Assignee: Canon Kabushiki Kaisha, Tokyo, Japan
[21] Appl. No.: 155,563
[22] Filed: Nov. 22, 1993

Related U.S. Application Data

[63] Continuation of Ser. No. 443,672, Nov. 30, 1989, abandoned.

[30] Foreign Application Priority Data

| Dec. 1, 1988 | [JP] | Japan | 63-302292 |
| Dec. 1, 1988 | [JP] | Japan | 63-302293 |
| Mar. 8, 1989 | [JP] | Japan | 1-55857 |
| Nov. 9, 1989 | [JP] | Japan | 1-290049 |

[51] Int. Cl.$^5$ .............................................. G11B 7/085
[52] U.S. Cl. ................... 369/44.28; 369/44.26; 369/44.32; 369/32; 369/50; 369/58
[58] Field of Search ............... 369/44.28, 44.27, 44.32, 369/44.11, 44.26, 50, 32, 58, 44.17, 44.25, 47, 48, 56, 111

[56] References Cited

U.S. PATENT DOCUMENTS

| 4,546,462 | 10/1985 | Koishi et al. | 369/44.32 |
| 4,611,315 | 9/1986 | Ogino | 369/44.32 |
| 4,841,498 | 6/1989 | Sugimura et al. | 369/58 |
| 4,873,679 | 10/1989 | Murai et al. | 369/50 |
| 4,896,311 | 1/1990 | Ishihara | 369/50 |
| 4,918,676 | 4/1990 | Miyasaka | 369/44.28 |
| 5,018,124 | 5/1991 | Ogasawara et al. | 369/44.32 |

FOREIGN PATENT DOCUMENTS 59-167874  9/1984  Japan.

Primary Examiner—W. R. Young
Assistant Examiner—Muhammad N. Edun
Attorney, Agent, or Firm—Fitzpatrick, Cella, Harper & Scinto

[57] ABSTRACT

An apparatus for recording and/or reproducing information with respect to a disk-like recording medium having a recording surface divided into a plurality of concentric circular zones each including a plurality of tracks with an address recorded thereon at an angular velocity or frequency varying with the individual zones, includes, a device for scanning the tracks for recording and/or reproducing information, a device for detecting an address of a track being scanned by the recording or reproducing device, a device for shifting the recording and/or reproducing device from a track being scanned to another track, and a control device for determining, if an address of a desired track cannot be detected when accessing the desired track during shifting of the recording and/or reproducing device to a zone different from a zone to which the desired track belongs, and shifting, as a result, the recording and/or reproducing device to a different track.

13 Claims, 7 Drawing Sheets

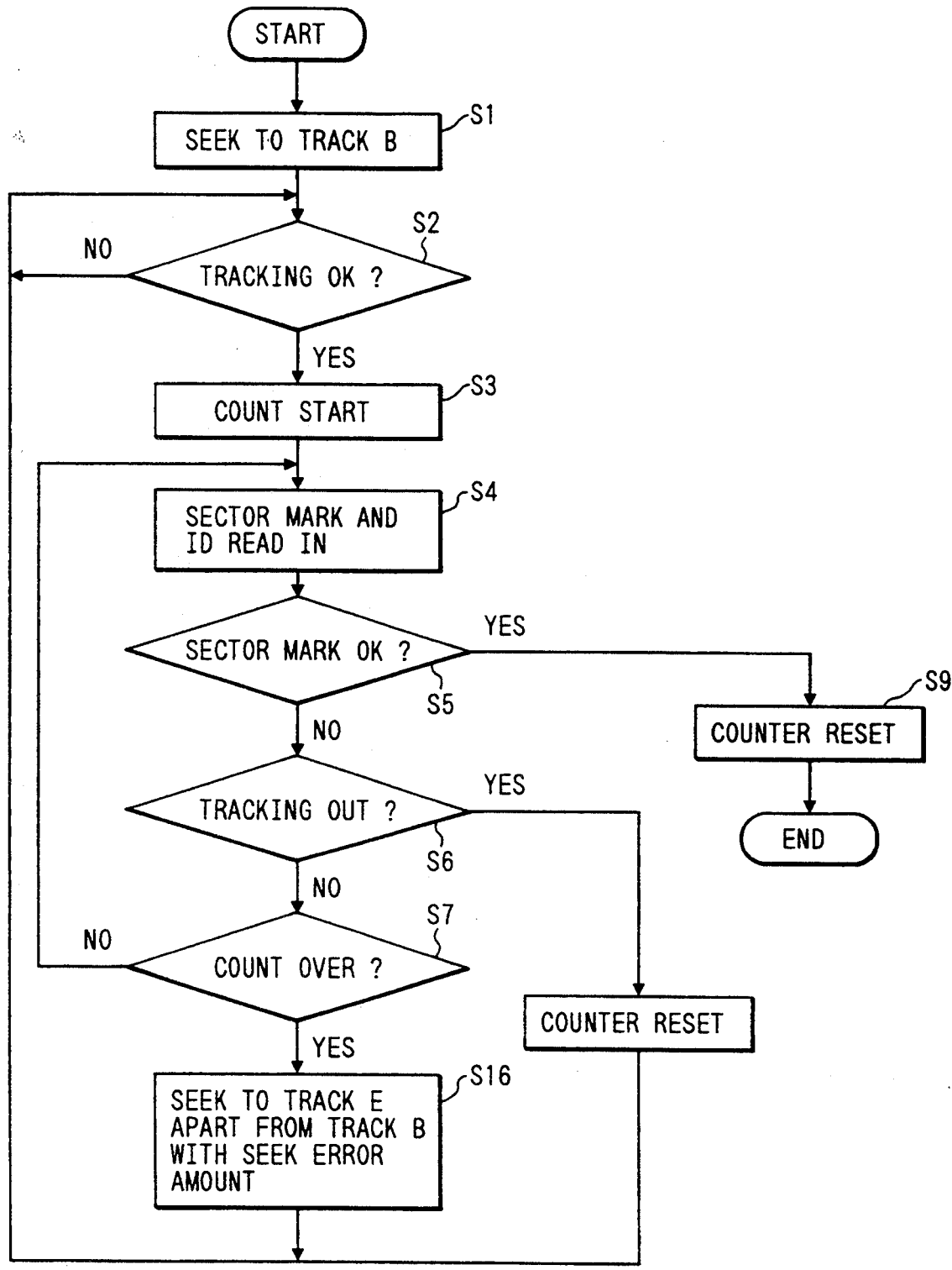

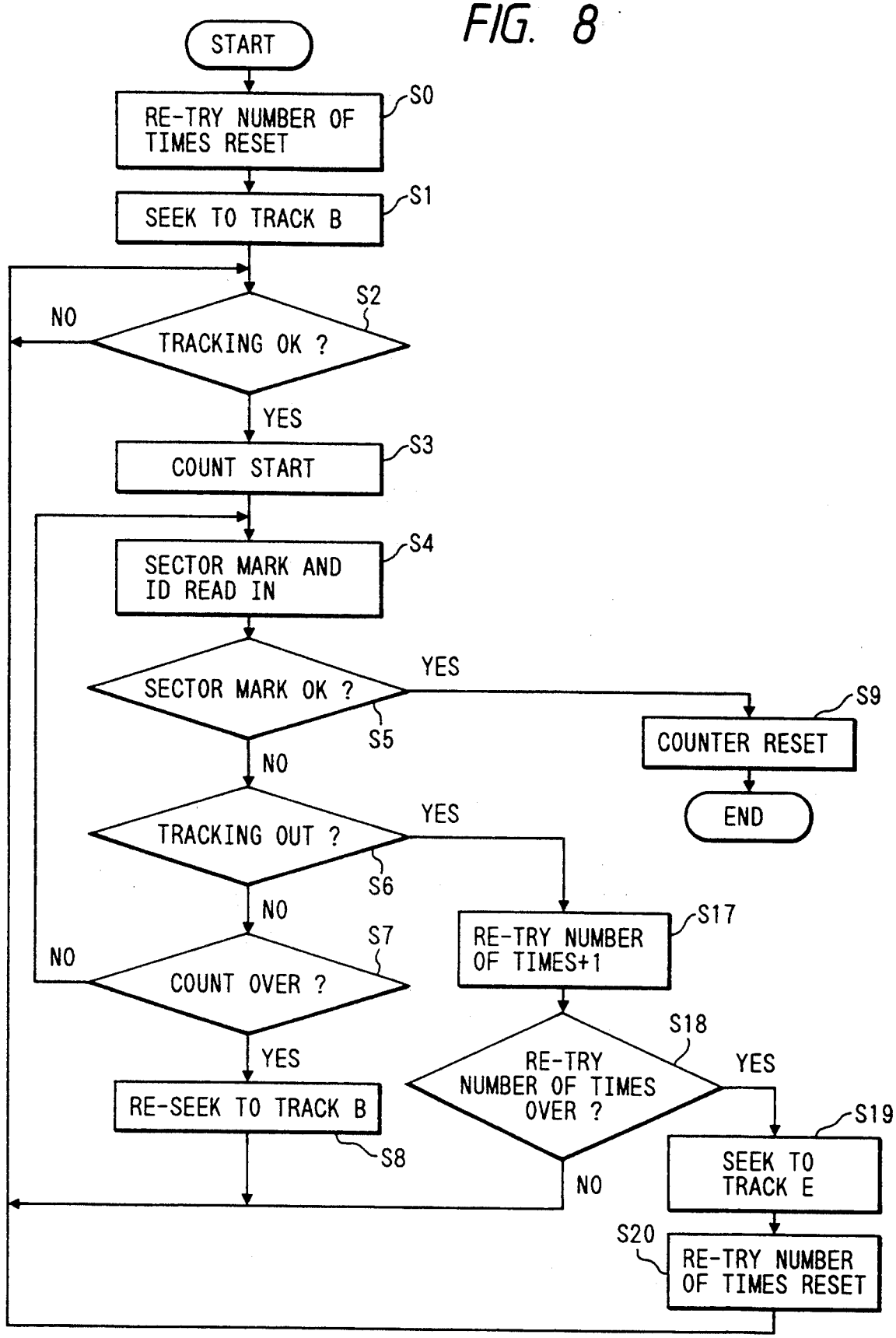

METHOD FOR ACCESSING DESIRED TRACK ON DISK WITH PLURALITY OF RECORDING ZONES WITH HEAD, AND APPARATUS THEREFORE

This application is a continuation of application Ser. No. 07/443,672, filed Nov. 30, 1989, now abandoned.

BACKGROUND OF THE INVENTION

Field of the Invention

This invention relates to a MCAV (modified constant angular velocity) type information recording/reproducing apparatus, and relates to a method for accessing a desired track on a disk with a head.

An optical disk is provided with a plurality of concentric or spiral tracks. For permitting recording of variable length data and also for accessing tracks at a high speed, each track is divided into a plurality of sectors and recording or reproduction is effected by a sector unit. In order to record the information, a laser beam emitted from a semiconductor laser is condensed on a recording layer on the disk to form a hole in the recording layer or change the reflectivity or transmittance of the layer so as to form a recording pit.

Such information recording apparatus are roughly classified into two types, i.e., a CLV (constant linear velocity) type, in which recording pits as noted above are recorded on a disk at a constant linear velocity, and a CAV (constant angular velocity) system, in which recording pits are recorded at a constant angular velocity. In the CAV type, because the pits are recorded at a constant angular velocity, the density of recorded data per unit length is reduced as one goes toward the inner periphery of disk. Therefore, this type is inferior in the aspect of the effective utility of the storage capacity. In the CLV type, the sectors are not radially arranged, and also the rotational number of the disk varies with the position on the disk. Therefore, data can not be reproduced until a target value is reached by the rotational number, at the time of accessing, resulting in a prolonged access time.

Then, there is proposed a MCAV type which features both the advantages of capability of ready accessing in the CAV type and high recorded data density of the CLV type, as disclosed, for instance, in Japanese Patent Kokai 59-167874. In this type, the disk area is divided, in the radial direction, into a plurality of concentric circular zones. The angular velocity of the disk is held constant when the head is on the same zone, and is reduced as the head goes toward the outer zones for recording or reproduction. Another well-known MCAV system, which can provide the same effect, the rotational number of disk is held constant, while the recording/reproducing frequency is increased as one goes toward outer zones for recording or reproduction.

In the meantime, in an information recording/reproducing apparatus using an optical disk as noted above, a track retrieving mechanism is provided for obtaining recording or reproduction with respect to any sector. Usually, such track retrieval is effected as follows. First, index data (including a track address or the like) of the track being presently scanned by a light beam is read out. An optical head is then shifted toward a desired track according to the difference between the address of the desired track and the read-out track address. The address of the destination address is also read out, and if it is not identical with the desired track address, the head is shifted again, or the light beam is kicked in a track-crossing direction with a lens actuator provided in the head, and then the destination track address is confirmed. The above sequence of operations is repeated until the identity of the track address is obtained.

Where the MCAV type is applied to the information recording/reproducing apparatus as noted above, however, a deficiency is rated. More specifically, when the apparatus receives a command to access a desired track, it first causes rotation of the disk at the angular velocity for the zone, to which the desired track belongs. Then, the optical head is shifted, and then the reading of index data is started as above mentioned. A deficiency is encountered at this time if the destination track belongs to a zone different from the desired track. More specifically, in this case no index data can be read out because of the difference of the angular velocity for read-out, thus resulting in a dead lock of the system, i.e., disability to proceed to the next operation. This problem arises as well with a MCAV type, in which the recording/reproducing frequency is varied for each zone.

SUMMARY OF THE INVENTION

An object of the invention is to provide a method and an apparatus for accessing track, which can solve the above problems in the prior art and are free from dead lock that might otherwise result when a zone different from a desired track is accessed by the head.

To attain the above object of the invention, there is provided an apparatus for recording and/or reproducing data with respect to a disk-like recording means having a recording surface area divided into a plurality of concentric circular zones each including a plurality of tracks with index data recorded thereon at an angular velocity or a frequency varying with the individual zones, comprising:

means for scanning the tracks for recording and/or reproducing data;

means for detecting index data of a track being scanned by the recording and/or reproducing means;

means for shifting the recording and/or reproducing means from a track being scanned to a different track; and control means for judging, if no destination track index data can be detected when accessing a desired track with shift of the recording and/or reproducing means, that the recording and/or reproducing means is on a zone different from a zone, to which the desired track belongs, and shifting, as a result, the recording and/or reproducing means to a different track.

BRIEF DESCRIPTION OF THE DRAWINGS

FIGS. 5, 7 and 8 are flow charts for explaining different embodiments of the method of track accessing according to the invention.

DETAILED DESCRIPTION OF THE PREFERRED EMBODIMENTS

Figure 1:
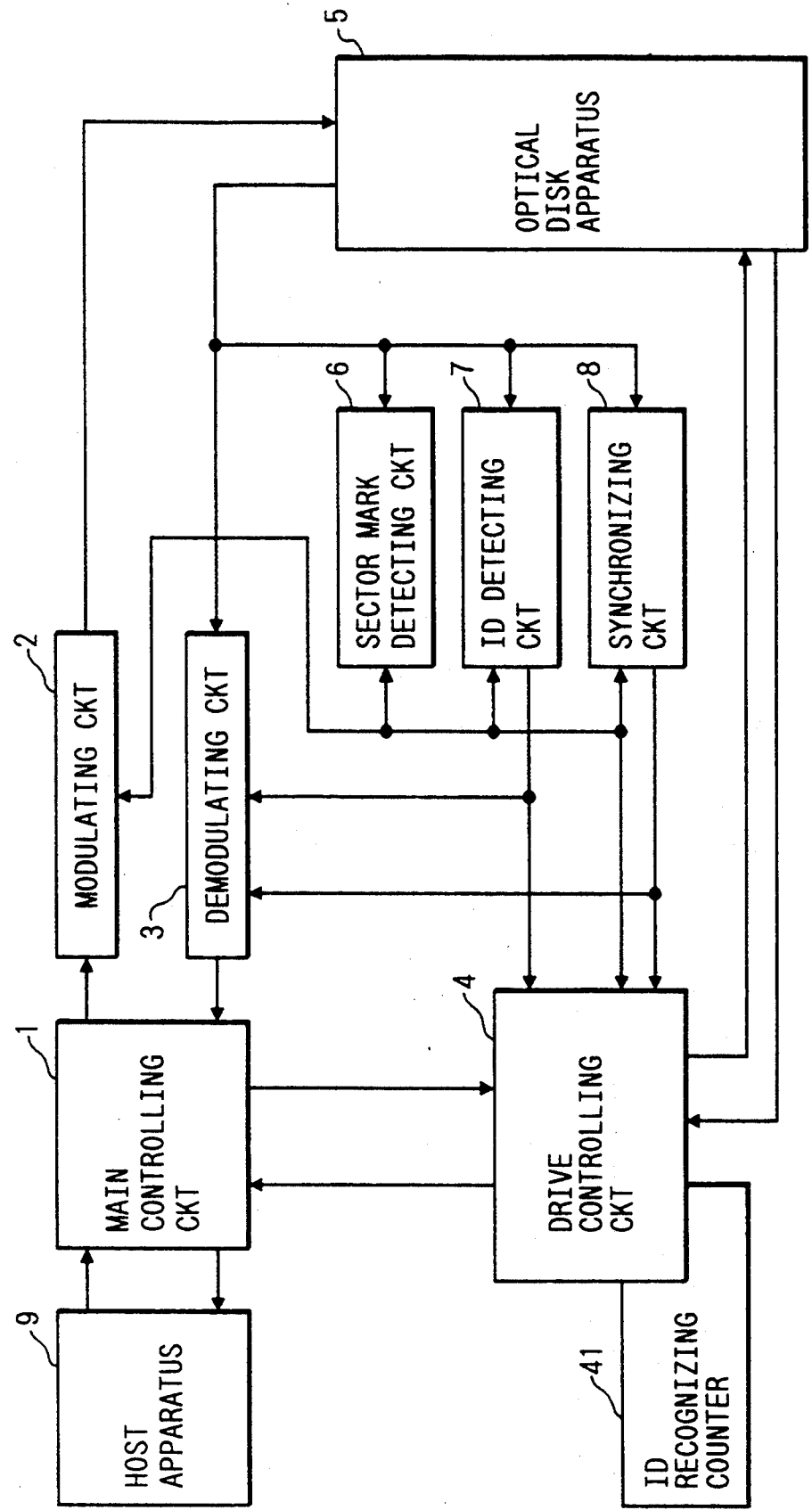
FIG. 1 is a block diagram showing an embodiment of the information recording/reproducing apparatus according to the invention.

FIG. 1 is a block diagram showing an information recording/reproducing apparatus embodying the invention. Basic functions of various parts of the apparatus will first be described. A main control circuit 1 supplies write data, from high-ranking apparatus (host apparatus) 9, to a modulating circuit 2 and also instructs a write track address to a drive control circuit 4. The drive control circuit 4 instructs an optical disk apparatus to shift an optical head to the write track. After receiving status information, which indicates that tracking starts, from the optical disk apparatus 5, an ID (index data) confirmation counter 41 in the drive control circuit 4 is rendered operative, and the circuit 4 now awaits detection data from a sector mark detecting circuit 6 and an ID detecting circuit 7.

The sector mark detector 6 detects a sector mark from reproduced data from the optical disk apparatus 5. When it detects such a sector mark, it informs the ID detector 7, a synchronizing circuit 8, the drive control circuit 4 and the modulator 2, of the sector mark detection. After the sector mark detection, the ID detector 7 and the sync circuit 8 supply ID data pre-formatted on the optical disk and a synchronizing pulse, respectively, to both of the drive control circuit 4 and a demodulating circuit 3. The demodulator 3 demodulates the data supplied from the optical disk apparatus 5 and the ID data supplied from the ID detector 7 using the sync pulse supplied from sync circuit 8 and supplies individual demodulated data to the main control circuit 1.

After the modulator 2 receives the detection data from the sector mark detector 6, it supplies modulated data to the optical disk apparatus 5. At this time, the modulator 2 may supply data after receiving a write command from the main control circuit 1. Also, the modulator 2 may supply data a predetermined period of time after the sector mark detection.

The main control circuit 1 receives the demodulated data from demodulator 3, sends the data to high-ranking apparatus 9, and sends the ID data which is used for producing instructions, to the drive control circuit 4 and also to the modulator 2. If the ID data indicates a desired track in a desired sector, modulator 2 is so instructed. If the ID data does not indicate the desired track, the desired track address is instructed to the drive control circuit 4.

The ID confirmation counter 41 in the drive control circuit 4 is reset after the reception of the ID detection data.

Figure 2:
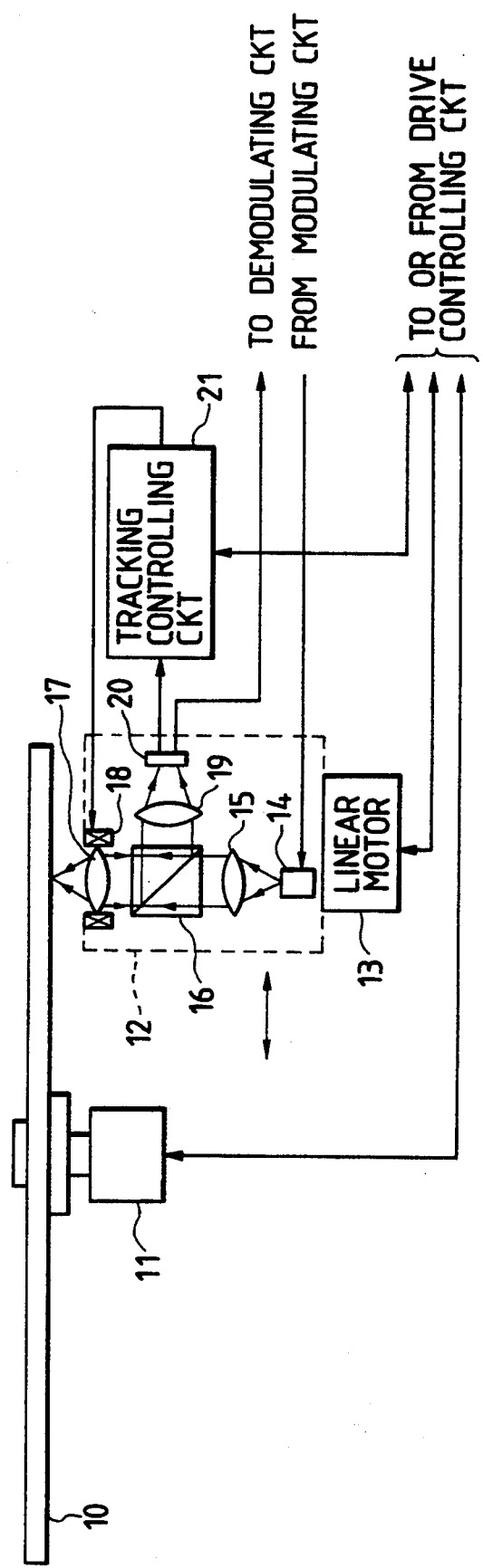
FIG. 2 is a schematic view showing a specific construction of an optical disk apparatus shown in FIG. 1.

FIG. 2 is a schematic view showing a specific construction of the optical disk apparatus shown in FIG. 1. Referring to this figure, an optical disk 10 is rotated by spindle motor 11. The spindle motor 11 is rotated according to a command from the drive control circuit 4 noted above and at an angular velocity corresponding to a zone, to which a desired track belongs.

The optical head 12 records or reproduces information with respect to optical disk 10, and the head 12 is shifted by a linear motor 13 in the radial direction of the optical disk 10. The linear motor 13 is controlled by the drive control circuit 4. The optical head 12 includes a semiconductor laser 14. The semiconductor laser 14 emits a light beam according to a signal supplied from the modulator 2. The light beam emitted from the semiconductor laser 14 is condensed, through a collimator lens 15, a beam splitter 16, by an objective lens 17, on optical disk 10.

The light beam reflected by optical disk 10 is transmitted again through the objective lens 17, deflected by the beam splitter 16 and led through a sensor lens 19 so as to received by an optical sensor 20. The optical sensor 20 reproduces the data according to the received reflected beam and transmits it to the demodulator 3 noted above. A tracking control circuit 21 detects a tracking signal from the output signal from optical sensor 20. According to this tracking signal, the objective lens 17 is shifted in the radial direction of the disk by a lens actuator 18 and auto-tracking operation starts. At the time of the track access (or seek), the tracking control circuit 21 supplies a pulse signal to the lens actuator 18 according to a command from the drive control circuit 4 so as to effect the kicking operation noted above.

Figure 3:
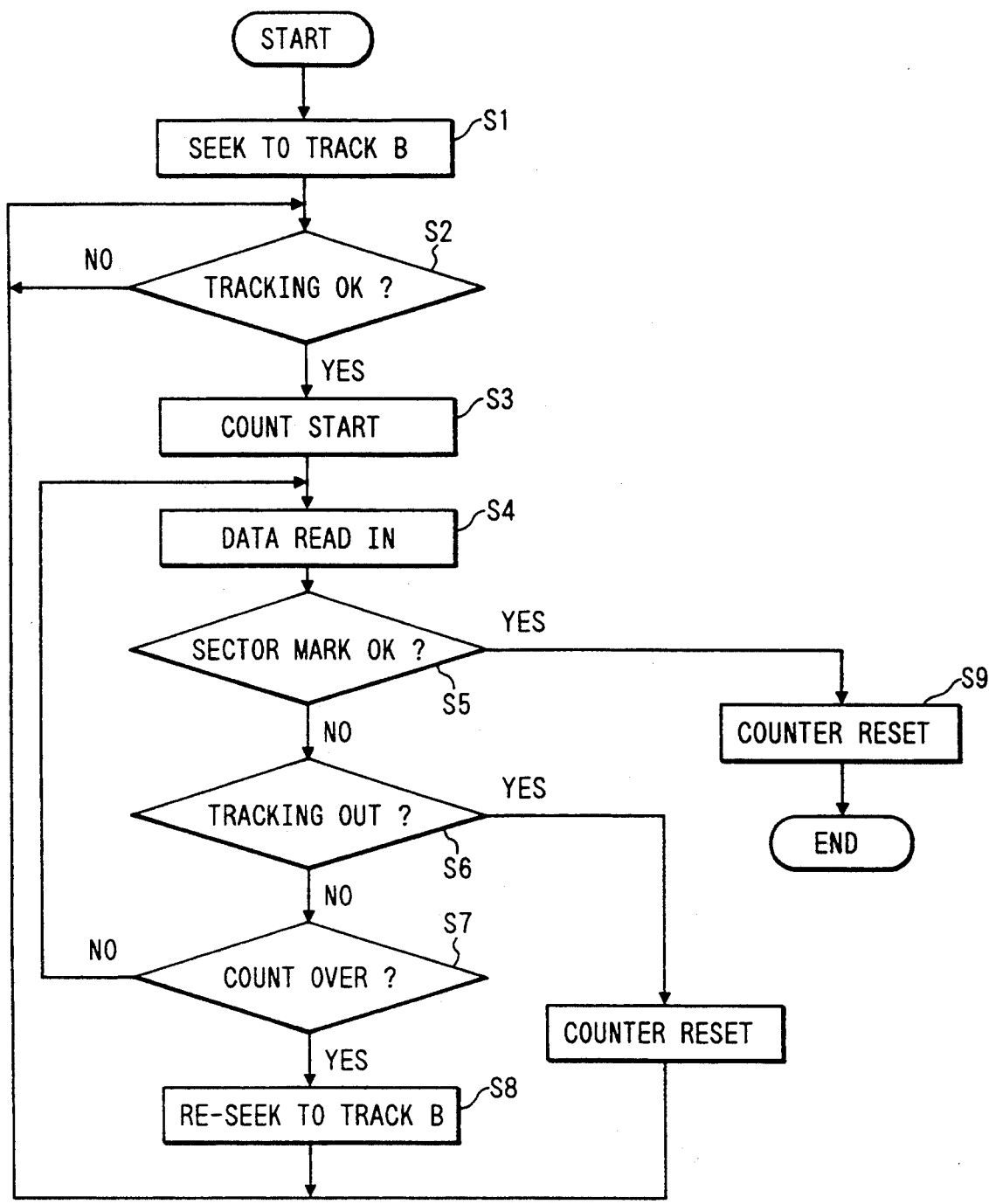
FIG. 3 is a flow chart for explaining an embodiment of the method of track accessing according to the invention.
Figure 4:
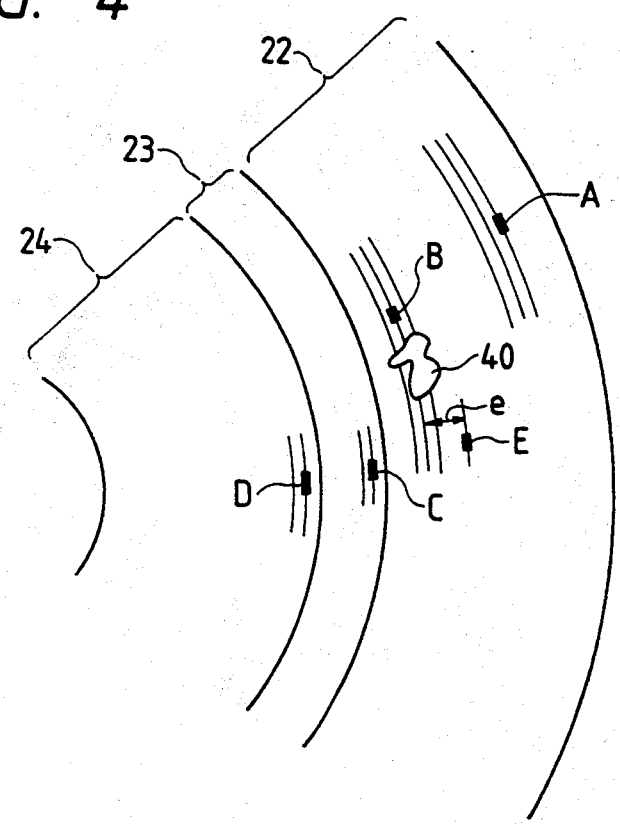
FIG. 4 is a schematic plan view showing an optical disk for explaining the method of track accessing according to the invention.

FIG. 3 shows a flow chart for the track access operation, and FIG. 4 is a schematic plan view for explaining the track access operation. Referring to FIG. 4, rectangular black marks represent the optical head. Designated at A, B and E are, respectively tracks in a first zone 22, C a track in an inhibition zone 23, and D a track in a second zone 24.

The track access method according to the invention will be described in detail with reference to FIGS. 3 and 4.

When shifting the head from the track A in first zone 22 to the track B in the same zone, track B is seeked by a coarse retrieval (step S1 in FIG. 3). By this seek operation, however, the desired track can not always be accessed due to a seek error.

Accordingly, after obtaining the tracking (YES in step S2), ID confirmation counter 41 (in FIG. 1) is rendered operative (step S3) to read a sector mark and an ID (step S4). When the sector mark is detected (YES in step S5), the ID confirmation counter is reset (step S9), thus bringing an end to the seek operation by determining that a desired track B is accessed.

Sometimes, however, de-tracking may be caused by a defect 40 as shown in FIG. 4, bringing the head to the track C in the inhibition zone 23 or the track D in the second zone 24. In such a case, no sector mark can be read out, and hence steps S4 to S7 are repeatedly executed. When this loop of operation is repeated continuously for a period of time corresponding to that of the scanning of one track by the head, count-over occurs (YES in step S7). In this case, the head is shifted to the zone 1 for seeking to the track B again (step S8).

If de-tracking occurs again during the operation of the steps S4 to S7 (YES in step S6), the counter is reset, and pull-in of tracking to the desired track is executed again (step S2).

Figure 5:
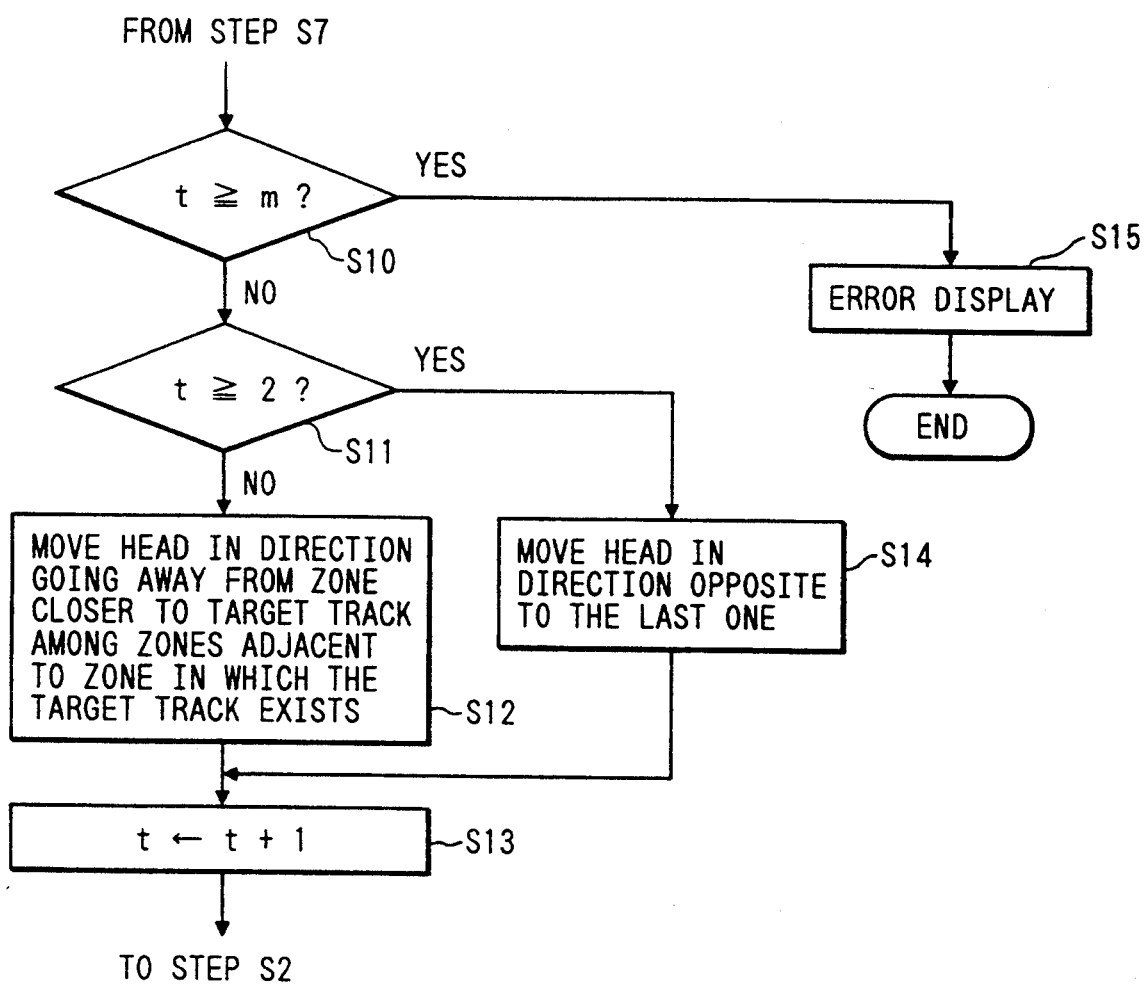

FIG. 5 is a flow chart illustrating a modification of the track access method according to the invention. This flow chart can replace the step S8 in the flow chart shown in FIG. 3.

If a count-over occurs in the step S7 in FIG. 3, the routine of this embodiment executes a step S10. In this step, t represents a frequency of a head shift counted, for example, in main control circuit 1. "1" is pre-set for t before the step S1 in FIG. 3. Represented by m is a predetermined number. This number is set to a limit number of times of re-trying of a track shift in a normal operation. That is, if the number of re-try times reaches m, a judgement that the apparatus is not normally operating is made. In this case, an error display is indicated in a step S15, and the operation is ended.

If it is found, in a step S10, that the number of re-try times is not reaching m and hence the step yields NO, a step S11 is executed. If the step S11 finds that the number of re-try times is 1 (yielding NO), a step S12 is executed. In this step, the head is shifted away from the closer one among the adjacent zones to the zone, to which the desired track belongs. This is done so, in order to increase the probability that the direction of the shift is toward the desired track. This will be described with reference to FIG. 6.

Figure 6:
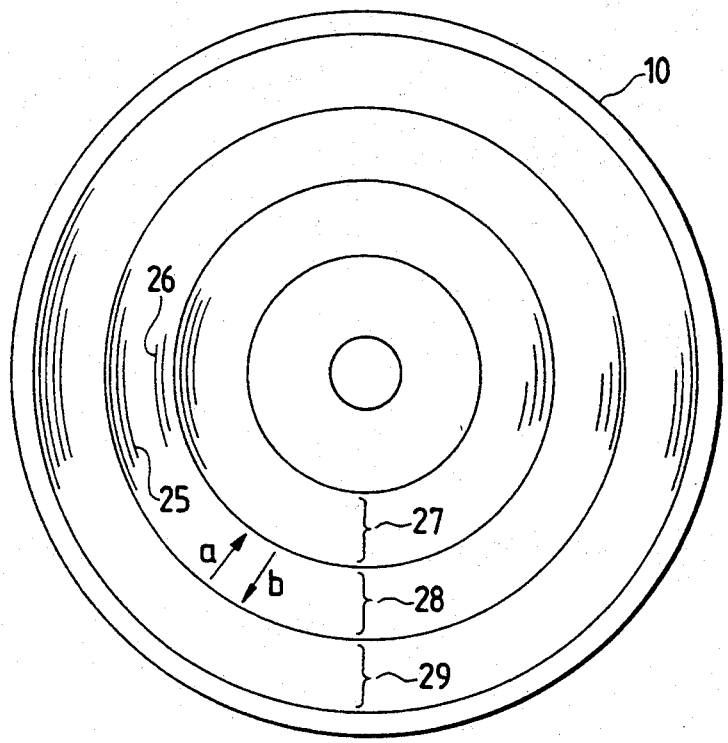
FIG. 6 is a schematic plan view showing an optical disk for explaining the method shown in FIG. 5.

FIG. 6 is a schematic plan view showing an optical disk, on which recording is done by the MCAV type. The optical disk 10 here has its recording surface divided into zones 27, 28 and 29. If the desired track to be accessed is a track 25 in the zone 28, there is a high possibility that the optical head erroneously accesses a track in the zone 29. Hence, in the case of the failure of the read-out of the ID of the desired track, the head is shifted in a direction away from the zone 29 closer to the track 25, i.e., in a direction a. If the desired track is the track 26, the head is conversely shifted in a direction away from the zone 27, i.e., in a direction b.

After the head has been shifted in the step S12, the number t of re-try times is up-counted in a step S13 and the routine returns to the step S2 in FIG. 13. In the case of the failure of the read-out of the ID, the routine goes, through the steps S7 and S10, to the step S11. Since at this time t is 2 (YES), the routine goes to a step S14. In the step S14, the head is shifted in the opposite direction to that of the shift of the last time. After the head shift, t is up-counted in the step S13, and the routine returns to the step S2. The above sequence of operation is repeatedly executed until the ID is read out or t reaches m.

FIG. 7 is a flow chart for illustrating a different embodiment of the track access method according to the invention. In this embodiment, the operation of the steps S1 to S7 and S9 is the same as in the previous embodiment described before in connection with FIG. 3, so its description is not given any further.

In the case that the head accessed the track C or D in FIG. 4, even if seeking to the track B from that track is liable to result in de-tracking again due to the defect 40. In this embodiment, in the case of the failure of the read-out of the ID, seeking is done to a track E distant from the track B by a seek error amount e. More specifically, from YES in the step S7, a step S16 is executed. In the step S16, the head is shifted to the first zone 22 for seeking to the track E.

The above operation permits approaching the detect 40 from a distant position while confirming its address. Even if tracking error is caused again by the defect 40, it is possible to have knowledge of the address and size of the track having the defect. In addition, there is no possibility that the defect 40 causes a tracking error again and again, and hence the deadlock of the apparatus can be prevented.

FIG. 8 is a flow chart showing a further embodiment of the track access method according to the invention. In this embodiment, the operation in the steps S1 to S9 is the same as in the embodiment described before in connection with FIG. 3, so its description is not provided.

In this embodiment, the number of re-try times counted by the main control circuit 1 is reset in a step S0, which is executed prior to the step S1. If de-tracking occurs in the step S6, 1 is added to the number of re-try times in a step S17, and the routine returns to the step S2 for pull-in of the tracking again. If it is detected in a step S18 that a specified number of re-try times is exceeded, the track E distant from the track B by a seek error amount e is seeked (step S19). Then, the number of re-try times is reset in a step S20, and the routine returns to the step S2 for pull-in of the tracking again. After reaching of the track E by the head, the head is brought closer to the track B, while scanning on a spiral track or repeatedly effecting track jump as in the embodiment described before in connection with FIG. 7.

While some preferred embodiments of the invention have been described in the foregoing, the various other applications of the invention are of course possible.

For example, in the case that there is a defect near the center of the first zone 22 in FIG. 4, it is possible to permit a track jump to the defect from the outer or inner side of the zone 22 to confirm the size of the detect, and to record the confirmed defect size data on the recording medium.

Further, it is possible to use a timer provided in the main control circuit 1 without the provision of the ID confirmation counter 41 so as to effect a similar process for obtaining the same effects of the invention.

Further, while the above embodiments have concerned with the cases where the optical disk has been used, the invention is by no means so limited, and the invention is applicable as well to data recording/reproducing apparatuses using other recording media such as a magnetic disk.

The invention covers all such applications without departing from the scope of the claims.

I claim:

1. An apparatus for recording and/or reproducing information with respect to a disk-like recording having a recording surface divided into a plurality of concentric circular zones each including a plurality of tracks with an address recorded thereon at an angular velocity or frequency varying with the individual zones, comprising:

instruction means for outputting an instruction indicative of an angular velocity or frequency corresponding to a zone to which a desired track among the plurality of tracks belong;

means for scanning said tracks for recording and/or reproducing information;

means for detecting an address of a track being scanned by said recording and/or reproducing means on the basis of the angular velocity or frequency instructed by said instruction means;

means for shifting said recording and/or reproducing means from a track being scanned to another track;

means for accessing the desired track with said recording and/or reproducing means such that said recording and/or reproducing means is shifted toward the desired track by said shifting means and an address of a track to which said recording and/or reproducing means is shifted is detected by said detection means on the basis of the angular velocity or frequency instructed by said instruction means, wherein said accessing operation is finished when the track to which said recording and/or reproducing means is shifted is identical with the desired track, and said accessing operation is continued when the track to which said recording and/or reproducing means is shifted is not identical with the desired track; and control means for controlling said apparatus such that in said accessing operation, when said recording and/or reproducing mean is erroneously shifted to a track belonging to a zone different from the zone to which the desired track belongs and an address of the track can not be detected due to a different angular velocity or frequency of the address recorded on the track to which said recording and/or reproducing means is shifted from that instructed by said instruction means, said recording and/or reproducing means is shifted toward another zone by said shifting means.

2. An apparatus according to claim 1, wherein, in the case of failure of the detection of the address, said control means shifts said recording and/or reproducing means in a direction away from a closer zone of adjacent zones to said zone, to which said desired track belongs.

3. An apparatus according to claim 1, wherein, in the case of the failure of the detection of the address after the shift of said recording and/or reproducing means to the different track, said control means shifts said recording and/or reproducing means again in an opposite direction to the direction in which said recording and/or reproducing means was shifted to the different track.

4. An apparatus for recording and/or reproducing information on an optical disk having a recording surface divided into a plurality of concentric circular zones each including a plurality of tracks with an address recorded thereon at an angular velocity or frequency varying wit the individual zones, comprising:

an instruction circuit for outputting an instruction indicative of an angular velocity or frequency corresponding to a zone to which a desired track among the plurality of tracks belong;

an optical head for scanning said tracks with a light beam for recording and/or reproducing information;

a detection circuit for detecting an address of a track being scanned by said optical head on the basis of the angular velocity or frequency instructed by said instruction circuit;

a motor for moving said optical head in the radial direction of said disk;

an access circuit for accessing the desired track with said optical head such that said optical head is moved toward the desired track by said motor and an address of a track to which said optical head is shifted is detected by said detection circuit on the basis of the angular velocity or frequency instructed by said instruction circuit, wherein said accessing operation is finished when the track to which said optical head is shifted is identical with the desired track, and said accessing operation is continued when the track to which said optical head is shifted is not identical with the desired track; and a control circuit for controlling said apparatus such that in said accessing operation, when said optical head is erroneously shifted to a track belonging to a zone different from a zone to which the desired track belongs and an address of the track to which said optical head is shifted cannot be detected due to a different angular velocity or frequency of the address recorded on the track to which said optical head is shifted from that instructed by said instructions circuit, said optical head is moved toward another zone by said motor.

5. An apparatus according to claim 4, wherein said optical head includes a light source, an optical system for converging a light beam emitted from said source onto said optical disk and an optical sensor for receiving a reflected light beam from said disk.

6. An apparatus according to claim 5, wherein, in the case of the failure of detection of the address, said control circuit shifts said optical head in a direction away from the closer zone among adjacent zones to said zone to which said desired track belongs.

7. An apparatus according to claim 5, wherein said detection circuit detects an address from the output of said optical sensor.

8. An apparatus according to claim 4, wherein, in the case of the failure of the detection of the address after the shift of said optical head to the different track, said control circuit shifts said optical head again in an opposite direction to the direction in which said optical head was shifted to the different track.

9. In an apparatus for recording and/or reproducing information with respect to a disk-like recording medium having a recording area divided into a plurality of concentric circular zones each including a plurality of tracks wit an address recorded thereon at an angular velocity or frequency varying with the individual zones, a method of accessing a desired track with recording and/or reproducing means, comprising the steps of:

(a) outputting an instruction indicative of an angular velocity or frequency corresponding to a zone to which the desired track belongs with an instruction circuit;

(b) moving the recording/and or reproducing means from a track being scanned toward the desired track;

(c) detecting an address of a track to which the recording and/or reproducing means is shifted on the basis of the angular velocity or frequency instructed by said instruction circuit;

(d) finishing the accessing operation after confirming that the track to which the recording and/or reproducing means is shifted is identical with the desired track on the basis of the detected address;

(e) continuing the accessing operation when the track to which the recording and/or reproducing means is shifted is not identical with the desired track; and (f) in the accessing operation, when the recording and/or reproducing means is erroneously shifted to a track belonging to a zone different from a zone to which the desired track belongs, and an address of the track to which the recording and/or reproducing means is shifted cannot be detected due to a different angular velocity or frequency of the address recorded on the track to which the recording and/or reproducing means is shifted from that instructed by the instruction circuit moving the recording and/or reproducing means toward another zone.

10. A method according to claim 9, wherein said recording and/or reproducing means is moved in a direction away from a zone at the side closer to the desired track among adjacent zones to which said desired track belongs in said step (f).

11. A method according to claim 9, wherein said steps (c) and (f) are executed repeatedly until an address is detected.

12. A method according to claim 11, wherein said recording and/or reproducing means is moved in an opposite direction to that of the last movement when said step (f) is executed according to the repetition.

13. A method according to claim 11, further comprising a step for displaying an error indication, in the case that the number of times steps (c) and (f) are repeatedly executed reaches a predetermined number, and stopping an operation of said apparatus.

* * * * *

UNITED STATES PATENT AND TRADEMARK OFFICE
CERTIFICATE OF CORRECTION

PATENT NO. : 5,343,453　　　　　　　　　　　　　　Page 1 of 2
DATED : August 30, 1994
INVENTOR(S) : TSUKASA OGINO It is certified that error appears in the above-indentified patent and that said Letters Patent is hereby corrected as shown below:

ON THE COVER PAGE

[54] TITLE

The title should read as follows: --APPARATUS AND METHOD FOR ACCESSING DESIRED TRACK ON DISK WITH PLURALITY OF RECORDING ZONES WITH HEAD--.

COLUMN 1

Line 1, "METHOD" should read --APPARATUS AND METHOD--.
Line 3, delete ", AND APPARATUS THEREFORE".

COLUMN 2

Line 7, "rated" should read --noted--.
Line 17, "dead lock" should read --deadlock--.
Line 25, "dead" should read -- dead- --.

COLUMN 4

Line 6, "to received" should read --to be received--.
Line 23, "respectively" should read --respectively,--.
Line 30, "seeked" should read --sought--.
Line 51, "to" should be deleted.

COLUMN 5

Line 44, "to" should be deleted.

COLUMN 6

Line 6, "seeked" should read --sought--.
Line 19, "detect," should read --defect,--.

UNITED STATES PATENT AND TRADEMARK OFFICE
CERTIFICATE OF CORRECTION

PATENT NO. : 5,343,453

DATED : August 30, 1994

INVENTOR(S) : TSUKASA OGINO

It is certified that error appears in the above-indentified patent and that said Letters Patent is hereby corrected as shown below:

<u>COLUMN 7</u>

Line 32, "wit" should read --with--.

<u>COLUMN 8</u>

Line 26, "with" should read --with--.

Signed and Sealed this

Seventh Day of March, 1995

*Attest:*

BRUCE LEHMAN

*Attesting Officer*      *Commissioner of Patents and Trademarks*